(12) United States Patent
Otto

(10) Patent No.: US 8,893,831 B2
(45) Date of Patent: Nov. 25, 2014

(54) SWATHER TRACTOR WITH REAR WHEEL ACTIVE STEERING

(75) Inventor: Philip J. Otto, Winnipeg (CA)

(73) Assignee: MacDon Industries Ltd., Winnipeg, MB (CA)

( * ) Notice: Subject to any disclaimer, the term of this patent is extended or adjusted under 35 U.S.C. 154(b) by 266 days.

(21) Appl. No.: 13/554,396

(22) Filed: Jul. 20, 2012

(65) Prior Publication Data

US 2013/0075169 A1 Mar. 28, 2013

Related U.S. Application Data

(60) Provisional application No. 61/537,674, filed on Sep. 22, 2011.

(51) Int. Cl.
*B62D 9/00* (2006.01)
*B62D 11/04* (2006.01)
*B62D 11/24* (2006.01)

(52) U.S. Cl.
CPC *B62D 9/00* (2013.01); *B62D 11/04* (2013.01); *B62D 11/24* (2013.01)
USPC .......................... 180/6.3; 180/6.48; 180/305

(58) Field of Classification Search
CPC .... B62D 11/02; B62D 11/005; B62D 9/0026; B62D 9/002; B62D 9/00; B60B 35/1018
USPC .................. 180/6.2, 6.26, 6.3, 6.48, 305, 307
See application file for complete search history.

(56) References Cited

U.S. PATENT DOCUMENTS

| 2,808,269 | A | | 10/1957 | Cathey | |
|---|---|---|---|---|---|
| 3,888,323 | A | * | 6/1975 | Patton et al. | 180/6.3 |
| 4,320,810 | A | * | 3/1982 | Hillmann et al. | 180/6.3 |
| 5,975,224 | A | * | 11/1999 | Satzler | 180/6.44 |
| 6,554,084 | B1 | * | 4/2003 | Enmeiji | 180/6.24 |
| 6,668,965 | B2 | | 12/2003 | Strong | |
| 7,077,220 | B2 | * | 7/2006 | Dunn et al. | 180/6.2 |
| 7,159,687 | B2 | | 1/2007 | Dunn et al. | |
| 7,306,062 | B2 | | 12/2007 | Dunn | |
| 7,431,123 | B2 | * | 10/2008 | Irikura et al. | 180/307 |

FOREIGN PATENT DOCUMENTS

| CA | 2513614 | 4/2005 |
|---|---|---|
| CA | 2505458 | 7/2005 |
| WO | 9609950 | 4/1996 |

* cited by examiner

*Primary Examiner* — Anne Marie Boehler
(74) *Attorney, Agent, or Firm* — Adrian D. Battison; Ade & Company Inc.

(57) ABSTRACT

A swather tractor has a pair of driven ground wheels at one end where a header is supported and a pair of steerable wheels at the other end for supporting the tractor. The driven ground wheels are hydraulically driven so that an operator controlled steering control is arranged to control a differential in rate of supply of hydraulic fluid to control a relative speed of rotation of the driven wheels and thus a turning direction of the tractor. The steerable wheels have a steering system that is operable in response to the steering control to positively steer the steerable wheels and there is provided an arrangement to deactivate the steering system at large turns so that the steerable wheels are free to castor.

8 Claims, 3 Drawing Sheets

SWATHER TRACTOR WITH REAR WHEEL ACTIVE STEERING

This application claims the benefit under 35 USC 119 (e) of Provisional Application 61/537,674 filed Sep. 22, 2011.

This invention relates to a swather tractor with rear wheel active steering.

BACKGROUND OF THE INVENTION

Typical swather tractors include a frame which carries a cab and engine with a transverse frame assembly which carries on each of a pair of depending frame leg a respective one of a pair of driven wheels. The transverse frame assembly also carries a pair of lift arms each for supporting a header of the tractor to be moved in front of the tractor for crop harvesting.

At the rear of the frame is a transverse rear axle assembly which carries a pair of rear wheels. The rear wheels are castor wheels with a vertical castor shaft pivotal around a vertical axis at the respective end of the axle assembly and a single wheel mounted on a hub offset from the vertical axis so that the wheel hub defines a horizontal rotation axis for the wheel which is located at a position trailing the vertical castor axis.

The castor wheel is allowed to rotate freely and the steering for the tractor is provided by a differential in drive speed between the driven wheels so that the castor wheels merely follow the movement generated by the drive wheels and the frame.

In application filed Apr. 28, 2005, Ser. No. 11/116,418 published as 2006/0201732 (now U.S. Pat. No. 7,159,687 issued Jan. 9, 2007) and Canadian application filed Apr. 27, 2005, Serial No: 2,513,614 and assigned to the present assignee is shown a machine in which the machine travels in transport mode with the castor wheels leading the drive wheels (engine forward), and in this position the machine is much more stable and higher speeds are possible.

Thus the swather tractor can be driven in a cab forward position in a working mode with a header on the forward end. It is rotated to engine forward in the transport position for more stable higher speed travel. The driver's console is rotated in the cab with the steering and speed control elements moved with the seat for the driver to face forwards and its position is detected by switches. In the engine forward position for transportation, the control system detects the seat position and operates the controls for higher speed drive and to prevent operation of the header. It is known that the tractor that is transported in the normal direction (header first) is less stable than when the engine is first. Thus the castor wheels must be freely turnable to follow the direction of travel and must be free to rotate fully around the vertical castor axis.

To vary the speed of the machine, both pump displacements are changed simultaneously. To steer the machine, the displacement of each pump is varied relative to each other so that the flow to each wheel is different which causes the machine to turn.

In application filed Jul. 25, 2005, Ser. No. 11/188,293 published as 2007/0017712 (now issued as U.S. Pat. No. 7,306,062 issued Dec. 11, 2007) and Canadian application filed Jul. 21, 2005, Serial No: 2,505,458 and assigned to the present assignee is shown a steering and speed control arrangement for the above machine.

The disclosures of the above patents are incorporated herein by reference or may be referred to for further details.

The center of gravity of the machine is somewhere between the drive wheels and the caster wheels. Any acceleration or deceleration of the machine imparts a force at the center of gravity. When in a right turn, there is a force on the machine at the center or gravity. This force increases with speed and smaller turning radius. The direction of this force is causing the machine to want to go into an even sharper turn and the operator has to fight this constantly with every movement of the rear of the machine, making the machine hard to control. This is why the speed of windrowers has been limited to approximately 16 mph up to now.

It has long been known that a windrower, which is hydrostatically steered while traveling with the caster wheels trailing the machine, can become unstable at speeds above about 15 mph. Also, when a hydrostatically steered machine is stopped or slowed abruptly, the steering/drive system may exceed relief pressure and steering control is then lost. In addition, the automatic steering of these machines in the field becomes difficult at higher speeds due to the imprecise nature of the hydrostatic steering system.

Dual path traction propelled machinery such as the windrower requires a differential moment to be applied by the traction wheels simultaneously to the propulsion forces in order to generate a steering function. Ample differential torque can be generated when the hydraulic transmission is in a field range that provides high torque/low speed. In medium field range and transport range that provides lower torque/higher speed, steering commands are less effective and when maximum torque is required for braking operations, available steering torque is compromised. A windrower feature is the infinitely variable steering during field operation by utilizing a pair of caster wheels to support one end of the machine. However during transport and high speed field operations, full caster function is not required.

SUMMARY OF THE INVENTION

It is one object of the present invention to provide a swather tractor of the above general type which provides an improved steering action.

According to the invention there is provided a swather tractor comprising:

a tractor frame carrying a cab at or adjacent a first end of the frame and carrying an engine and a drive system at or adjacent a second end of the frame;

a pair of driven ground wheels mounted on the frame of the tractor at the first end for supporting the tractor;

a pair of steerable wheels each mounted on the frame of the tractor at the second end for supporting the tractor;

each of the driven ground wheels including a respective drive motor driven by hydraulic fluid from at least one hydraulic pump of the drive system for powering motion of the tractor over the ground;

an operator controlled speed control arranged to control a rate of supply of hydraulic fluid from the at least one hydraulic pump to the respective drive motors to control a common speed of rotation of the driven wheels and thus a speed of movement of the tractor;

an operator controlled steering control arranged to control a differential in rate of supply of hydraulic fluid from the at least one hydraulic pump to the respective drive motors to control a relative speed of rotation of the driven wheels and thus a turning direction of the tractor;

a support system arranged for supporting a header at the first end of the frame;

the steerable wheels having a steering system that is operable in response to the steering control to steer the steerable wheels;

wherein there is provided an arrangement to deactivate the steering system so that the steerable wheels are free to castor.

As set forth above, the tractor can travel in both direction for field operation and transport so that the terms "rear" and "front" are not relevant. However, as used herein, the terms are typically used in field operation so that the front is typically considered the end with the driven wheels and the header.

Preferably the steering system is arranged to steer the machine through steering corrections during near straight line travel.

Preferably the steering system is deactivated when the steering control is used to make a severe turn that is required for machine maneuverability at the end of the field during crop cutting.

Preferably each of the rear wheels is a castor wheel with a vertical pin defining a vertical castor axis.

Preferably the steering system is arranged to steer the rear wheels using Ackerman geometry.

Preferably the caster wheel steering system allows positive positioning of the caster wheels to aid in steering of the vehicle in situations where high speed and limited steering angle is desired but also retain the full maneuverability from the caster wheels when the system is not engaged.

Preferably the steering system uses a through-rod hydraulic cylinder fixed at the center of the rear axle with a tie rod connected to each rear wheel from the through-rod.

Preferably the tie rod connects to a steering lever on a device that is attached to the end of each caster axle pivot shaft.

Preferably there is provided a mechanism at the pivot shaft that remotely selects whether a steering arm is positively connected to the caster shaft or whether the shaft can freely rotate about its axis.

Preferably the tractor includes an operator controlled steering control which has a position sensor that communicates electronically a required steering position to the steering system of the rear wheels to match the cylinder position to the desired steering wheel angle.

Preferably when steering commands are generated by the position sensor, the rear wheels are positioned by the cylinder at the appropriate angle to effectively steer the machine in parallel to the dual path transmission.

Preferably, when it is desired that the caster wheels pivot freely, the system disengages the rear steering system from positioning the caster pivot shafts.

Preferably, in the event of diminished torque or transmission failure, the rear steering system controls the steering direction.

Preferably the rear wheel system includes a releasable latch at an upstanding castor pin of each rear wheel.

Preferably the releasable latch is activated when positive steering is required and only reengages when the rear castor wheel reaches the position of the rear steering system.

Preferably the rear steering is positive when engaged and does not slip in response to forces on the rear wheels from the ground.

The arrangement herein thus provides a selectable caster wheel steering system allows positive positioning of the caster wheels to aid in steering of the vehicle in situations where high speed and limited steering angle is desired but also retain the full maneuverability from the supportive caster wheels when the system is not engaged.

Two caster wheels are supported at the ends of an axle. An Ackerman style steering system using a through-rod hydraulic cylinder is fixed at the center of the axle and has a tie rod connected to each end. The other end of the tie rods connects to a steering lever on a device that is attached to the end of each caster axle pivot shaft. This device contains a mechanism that remotely selects whether a steering arm is positively connected to the caster shaft or whether the shaft can freely rotate about its axis. When conditions permit, the caster shaft steering devices that connect the cylinder to the caster wheels activates and allows the caster to pivot until it latches at one or more defined locations.

The operator's steering wheel and cylinder have a position sensor that communicates their position to a controller which activates a valve to match the cylinder position to the desired steering wheel angle. The steering wheel angle also controls the transmission which generates the dual path differential speed of the traction wheels.

When steering commands are generated, the caster wheels are positioned by the cylinder at the appropriate angle to effectively steer the machine in parallel to the dual path transmission. When it is desired that the caster wheels pivot freely the system disengages the cylinder from positioning the caster pivot shafts. In the event of diminished torque or transmission failure, the caster wheels can control the steering direction.

The arrangement has the following advantages:

1. Directional control becomes possible when traction grip or available torque is limited due to heavy braking and/or limited weight on drive wheels in dual directions.

2. Provides redundant steering ability in the event of mechanical failure of dual path transmission.

3. Improves machine stability at high speeds in field mode when center of mass is behind steered axle.

4. Allows the same degree of maneuverability that windrowers require and have always been capable of when active caster steering is disengaged.

5. Provides ability to power caster wheels to provide 4WD when caster wheels are actively steered.

6. Steering system is simpler to control as it only employs one cylinder, hydraulic valve, and position sensor.

DETAILED DESCRIPTION

Figure 1:
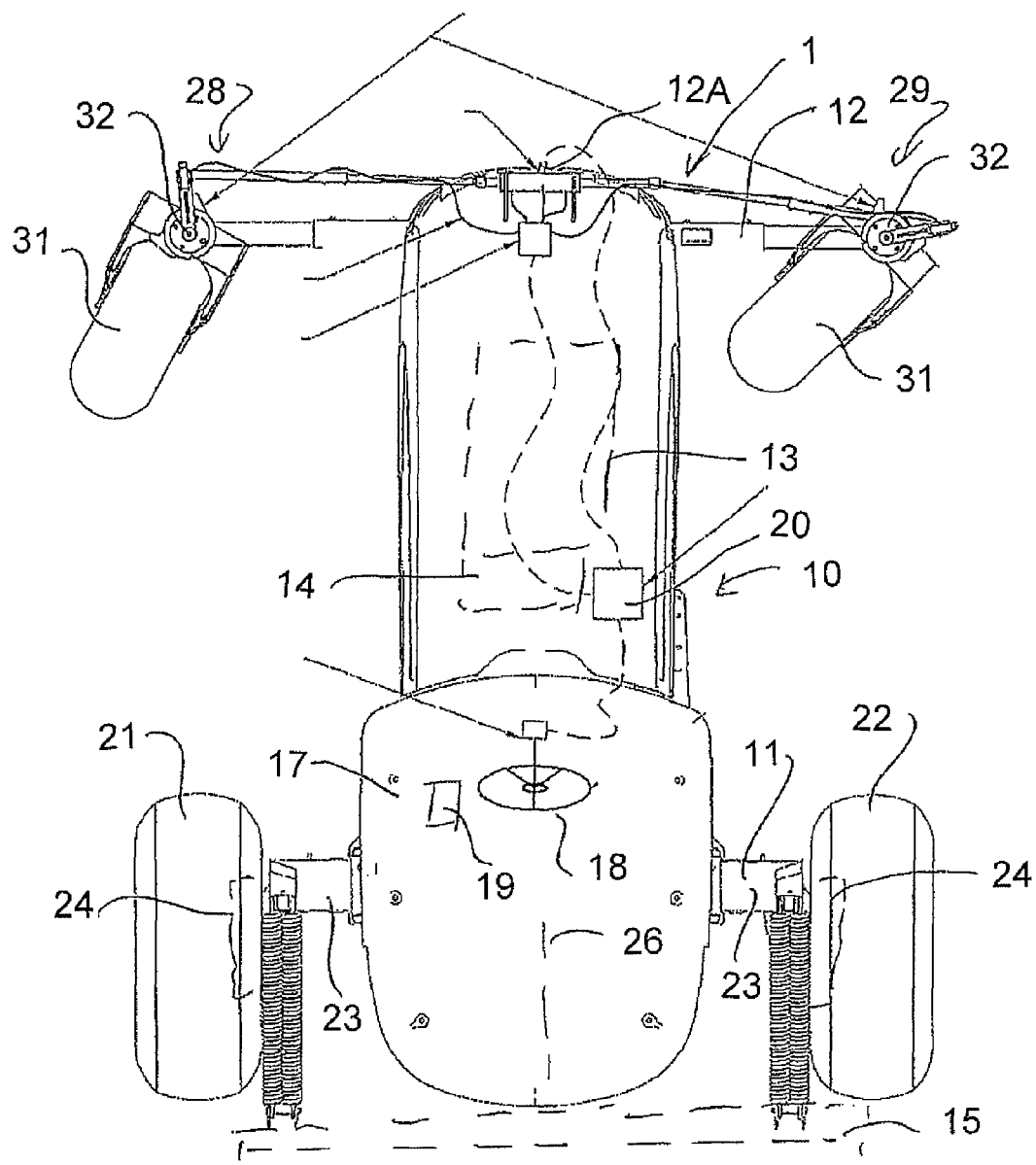
FIG. 1 is a top plan view showing schematically a swather tractor according to the present invention.
Figure 2:
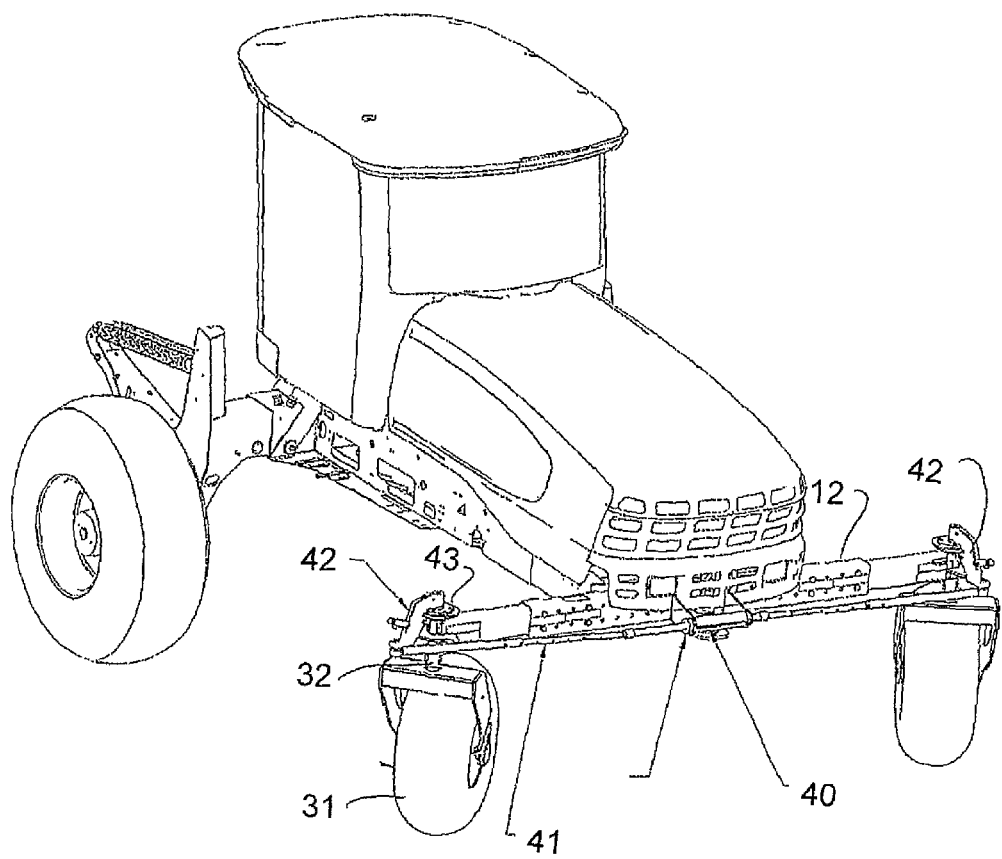
FIG. 2 is an isometric view of the tractor of FIG. 1.
Figure 3:
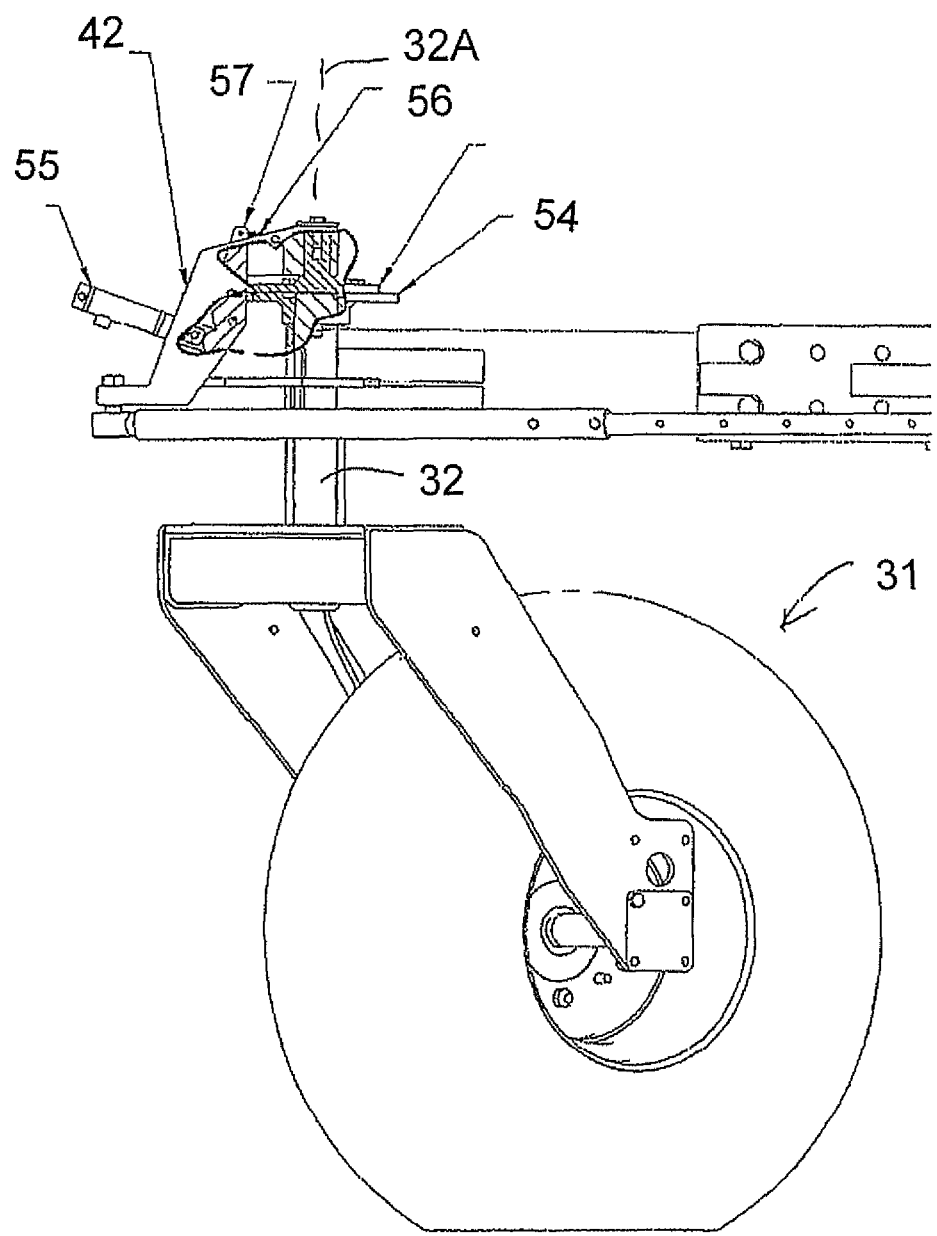
FIG. 3 is a rear elevational view of one rear wheel of the tractor of FIG. 1 showing the steering in more detail.

In FIG. 1 is shown a tractor of the above type which includes a frame 10 with a front axle 11 and a rear axle 12. On the frame 10 is mounted a motor 13 driving a gear box and pump assembly schematically indicated at 14 for communicating hydraulic drive fluid to the various components of the tractor for propelling the tractor and for driving an implement 15 mounted on the tractor. In one example, the engine drives a gearbox at the rear of the engine that splits the power to two pump assemblies. One pump assembly has two pumps (one for each wheel) for traction drive and each pump controls one wheel. The other pump assembly has four pumps (two for header drive, one for lift functions and one providing supercharge oil). In the embodiment shown the implement is a header arranged for cutting a standing crop with the header carried on support arms 16 mounted on the tractor at the forward end in conventional manner. The tractor includes a cab 17 including steering 18 and control elements 19 operable by the driver with those control elements and steering acting to communicate control movements to a fluid control system generally indicated at 20 which supplies the fluid to the various elements to be driven.

The tractor includes first wheels 21 and 22 mounted on legs 23 extending downwardly from the front axle 11. Each leg carries a drive motor 24 for providing drive power to the respective wheel 21, 22 in response to the supply of hydraulic fluid from the control unit 20. The wheels 21 and 22 are mounted on hubs attached to the motors 24 so that the wheels are supported at a fixed angle to the frame so as to be parallel to each other and parallel to a center line 26 of the tractor. Thus the tractor is not steered by pivotal movements of the wheels 21 and 22 which are fixed.

Typically the rear axle 12 is mounted for pivotal movement on a center pivot 12A defining a horizontal axis longitudinal of the center line of the tractor so as to form what is commonly known as a walking beam. However other suspension arrangements can be used including a split rear axle where two parts pivot independently. The rear axle can include mechanical or gas springs to resist pivotal movements. The individual rear castor wheels can also be sprung relative to the rear axle.

At the outer end of each portion 28, 29 is mounted a respective castor wheel 31 which can swivel around a vertical pivot member 32 of the castor. Thus the wheels on the axle 12 are castor wheels which can rotate around the vertical axis defined by the pivot 32.

Tractors of this type are well known and are highly maneuverable since the steering is effected by differential speed or differential rotation of the wheels 21 and 22 with the castor wheels 31 merely following the steering action as required. It is well known that such tractors are generally used with the driven wheels 21 and 22 forward so that the implement is in front of those wheels.

However for high speed movement the vehicle is driven in the opposite direction so that the driven wheels 21 and 22 are at the rear and the castor wheels are at the front. This is known to provide an improved stability of the tractor at higher transport speeds and may provide an improved arrangement.

The speed control 19 is arranged to provide a system either by electronic control "drive by wire" or mechanically to control a rate of supply of hydraulic fluid from the hydraulic pump to the respective drive motors 24 to control a common speed of rotation of the driven wheels and thus a speed of movement of the tractor and the steering control 18 is arranged to provide a differential in rate of supply of hydraulic fluid from the hydraulic pump to the respective drive motors 24 to control a relative speed of rotation of the driven wheels and thus a turning direction of the tractor.

Turning now to the details of the present arrangement, the rear wheel assembly 12 includes a steering system 1 that is operable in response to the steering control to steer the rear wheels.

The steering system 1 is arranged to steer the machine through steering corrections during near straight line travel. The steering system 1 is deactivated when the steering control is used to make a severe turn that is required for machine maneuverability at the end of the field during crop cutting.

Each of the rear wheels 31 is a castor wheel with a vertical pin 32 defining a vertical castor axis 32A.

The steering system 1 includes a single steering cylinder 40 which includes a steering rod 41 extending to each side of the cylinder. The rod connects at each end to a respective steering link 42 which is arranged to steer the rear wheels using well known Ackerman geometry. Each link 42 connects to the respective castor pin 32 by a latch system 43. The latch system 43 includes a latch plate 54 which cooperates with a latch pin 55 operated by a motor or cylinder 55 through a lever 57. A spring 56 allows the pin to remain disengaged from the plate 54 until the receptacle in the plate is aligned.

The caster wheel steering system allows positive positioning of the caster wheels to aid in steering of the vehicle in situations where high speed and limited steering angle is desired but also retain the full maneuverability from the caster wheels when the system is not engaged.

The steering system uses a through rod hydraulic cylinder 40 fixed at the center of the rear axle 12 with the tie rod 41 connected to each rear wheel from the through rod connected to the piston of the cylinder 40.

The tie rod 41 connects to the steering lever 42 on a device that is attached to the end of each caster axle pivot shaft 32.

The latch 43 at the pivot shaft 32 remotely selects whether the steering 42 arm is positively connected to the caster shaft 32 or whether the shaft 32 can freely rotate about its axis. This latch is operated either by the driver or by the control system of the tractor depending on the steering and drive conditions. Thus the latch may be actuated in response to vehicle speed, vehicle direction, steering input value, header drive actuation or other inputs which are used to determine when steering close to the straight ahead direction is required.

Thus an operator controlled steering control has a position sensor that communicates electronically a required steering position to the steering system of the rear wheels to match the position of the cylinder 40 to the desired steering wheel angle. When steering commands are generated by the position sensor, the rear wheels are positioned by the cylinder at the appropriate angle to effectively steer the machine in parallel to the dual path transmission.

Thus, in the event of diminished torque or transmission failure which is sensed by a sensor in the drive system, the rear steering system is activated and controls the steering direction.

When it is desired that the caster wheels pivot freely for example for a turn at an end of the field where much larger steering angles are required, the system disengages the rear steering system from positioning the caster pivot shafts. This can be achieved by detecting a steering input from the operator controlled steering wheel which is greater than a predetermined maximum angle and by activating the retraction of the latch when the angle is exceeded.

The releasable latch thus is activated when positive steering is required and reengages when the rear castor wheel reaches the position of the rear steering system. That is the latch pin 55 remains out of the receptacle or hole in the plate 54 and slides over the plate until the plate castors to the aligned position when the pin drops into place.

The rear steering from the cylinder 40 is positive when engaged and does not slip in response to forces on the rear wheels from the ground. The active steering is effected therefore by the rear wheel steering when engaged and the differential steering by the front wheels follows this positive steering.

The deactivation of the steering system can also be provided simply by removing the application of driving fluid to the cylinder 40 allowing the cylinder to freely slip and reverting the wheel to a conventional castor wheel. The latch can also be provided between the rod 41 and the cylinder. Other arrangements for achieving the above drive conditions can be provided.

The invention claimed is:
1. A swather tractor comprising:
a tractor frame carrying a cab at or adjacent a first end of the frame and carrying an engine and a drive system at or adjacent a second end of the frame;
a pair of driven ground wheels mounted on the frame of the tractor at the first end for supporting the tractor;

a pair of steerable wheels each mounted on the frame of the tractor at the second end for supporting the tractor;

each of the driven ground wheels including a respective drive motor driven by hydraulic fluid from at least one hydraulic pump of the drive system for powering motion of the tractor over the ground;

an operator controlled speed control arranged to control a rate of supply of hydraulic fluid from the at least one hydraulic pump to the respective drive motors to control a common speed of rotation of the driven wheels and thus a speed of movement of the tractor;

an operator controlled steering control arranged to control a differential in rate of supply of hydraulic fluid from the at least one hydraulic pump to the respective drive motors to control a relative speed of rotation of the driven wheels and thus a turning direction of the tractor;

a header carried on a support system at the first end of the frame;

wherein each of the steerable wheels is a castor wheel with a vertical castor axis and a steering link arranged to rotate the castor wheel about the vertical castor axis;

a steering system that is operable in response to the steering control to operate the steering links to steer the steerable wheels;

wherein there is provided a latch arrangement at the steering link that remotely selects whether the steering system is positively connected to the steering link or whether the steering system is disconnected to allow the castor wheel to freely rotate about the vertical castor axis so that the steerable wheels are free to castor;

and wherein the latch arrangement is arranged to operate such that the steering system is arranged to steer the machine through steering corrections during near straight line travel and the steering system is disconnected at all other positions.

2. The swather tractor according to claim 1 wherein the steering system and the steering links are arranged to steer the rear wheels using Ackerman geometry.

3. The swather tractor according to claim 1 wherein the steering system uses a through-rod hydraulic cylinder fixed at a center of a rear axle with a respective tie rod connected from the through-rod to each steering link.

4. The swather tractor according to claim 1 wherein the operator controlled steering control has a position sensor that communicates electronically a signal indicting a required steering position to the steering system.

5. The swather tractor according to claim 4 wherein the steerable wheels are positioned in response to said signal at an angle to effectively steer the tractor at the same direction as the turning direction of the tractor as determined by the relative speed of rotation of the driven wheels.

6. The swather tractor according to claim 1 wherein, in the event of diminished torque or transmission failure, the steering system controls the steering direction of the tractor by steering the steerable wheels.

7. The swather tractor according to claim 1 wherein the latch arrangement is reengaged only when the steerable wheel pivots back to reach the position required by the steering system.

8. The swather tractor according to claim 1 wherein the steering system is positive when engaged and does not slip in response to forces on the steerable wheels from the ground.

* * * * *